United States Patent

[11] 3,627,246

| | | | |
|---|---|---|---|
| [72] | Inventors | Fred B. Widding; Arthur Shull, both of Ithaca, N.Y. | |
| [21] | Appl. No. | 859,838 | |
| [22] | Filed | Sept. 22, 1969 | |
| [45] | Patented | Dec. 14, 1971 | |
| [73] | Assignee | Lansing Research Corporation Ithaca, N.Y. | |

[54] ISOLATING LEG STRUCTURE FOR TABLES AND THE LIKE
4 Claims, 3 Drawing Figs.

[52] U.S. Cl. ................................................ 248/188.8, 16/21, 248/20, 308/140
[51] Int. Cl. ........................................................F16m 11/22
[50] Field of Search............................................ 248/188.2, 188.3, 188.8, 188.9, 20, 21, 22, 24; 16/21, 26; 308/2, 139, 140

[56] References Cited
UNITED STATES PATENTS

| 1,735,881 | 11/1929 | Seastedt ........................ | 308/140 |
|---|---|---|---|
| 1,791,448 | 3/1931 | Johnson ........................ | 16/21 |
| 2,502,759 | 4/1950 | Singer ........................... | 16/21 |
| 3,146,979 | 9/1964 | Koetch .......................... | 248/20 |

FOREIGN PATENTS

| 14,603 | 6/1901 | Great Britain................ | 16/21 |
|---|---|---|---|
| 1,064,671 | 4/1967 | Great Britain................ | 248/20 |
| 1,420,394 | 11/1965 | France ......................... | 248/20 |

Primary Examiner—Marion Parsons, Jr.
Attorney—Jennings Bailey, Jr.

ABSTRACT: A table is supported on pistons carried by rolling diaphragms at the top of hollow legs. Sensing devices are provided which detect any deviation of the table from a preselected level position and which furnish air under pressure to the legs and permit it to be released therefrom so as to maintain the desired level position. Each leg is mounted at the bottom on thrust bearings having balls mounted between plane parallel surfaces.

PATENTED DEC 14 1971

3,627,246

INVENTOR
FRED B. WIDDING
ARTHUR SHULL

BY Jennings Bailey Jr

ATTORNEY

ISOLATING LEG STRUCTURE FOR TABLES AND THE LIKE

BACKGROUND OF THE INVENTION

1. Field of the Invention

The invention relates to a table and to a let isolator therefor which isolates the table from movements of the floor on which its rests.

2. The Prior Art

The patent to Cavanaugh, U.S. Pat. No. 3,310,263 shows a table with legs each containing a piston supported by a fluid under pressure with means for maintaining the table at a predetermined level.

The patent to Keetch, U.S. Pat. No. 3,146,979 shows a vibration isolator for machinery in which a leg is supported by ball bearings. These ball bearings travel in upwardly curved troughs for the purpose of converting horizontal displacements of the machinery relative to the floor to vertical displacements of the machinery.

SUMMARY OF THE INVENTION

The present invention provides a vibration isolation system for a table in which each leg is formed of hollow cylinders closed at the top by a rolling diaphragm which supports a piston to which the table top is secured. The bottom of this leg rests through a thrust ball bearing on a foot member adapted to engage a floor. The balls of the ball bearing move between surfaces which are plane, parallel and horizontal through the whole possible range of lateral movement of the bottom of the leg with respect to the foot member. The ball bearing is surrounded by a resilient ring which is positioned within a downward extension of the leg member, and which resiliently limits the lateral movement of the leg member with respect to the foot member.

It has been found that with this arrangement it is possible to cut in half or more the vertical vibration of the table top, as compared with a structure in which the ball bearing foot is not used, as well as lateral oscillations, when lateral motion exists in the floor.

BRIEF DESCRIPTION OF THE DRAWINGS

One embodiment of the invention is shown in the accompanying drawings, in which.

DESCRIPTION OF THE PREFERRED EMBODIMENTS

Figure 1:
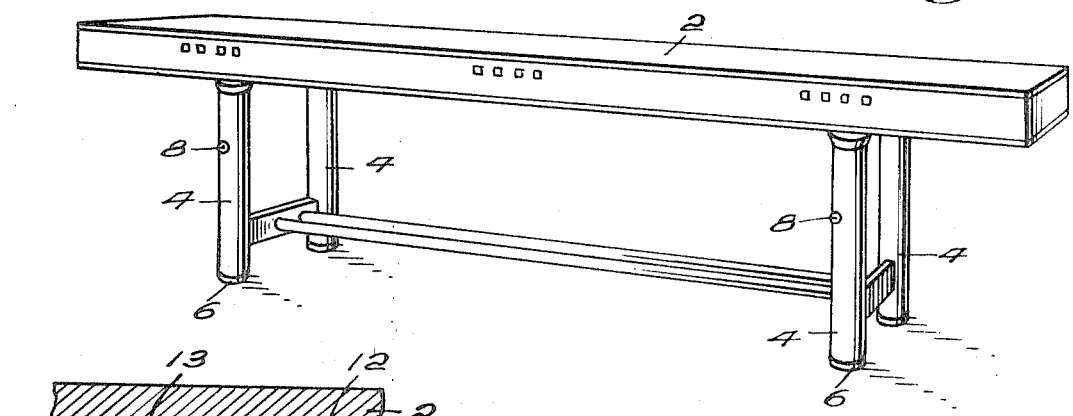
FIG. 1 shows in perspective view a table embodying the invention.
Figure 3:
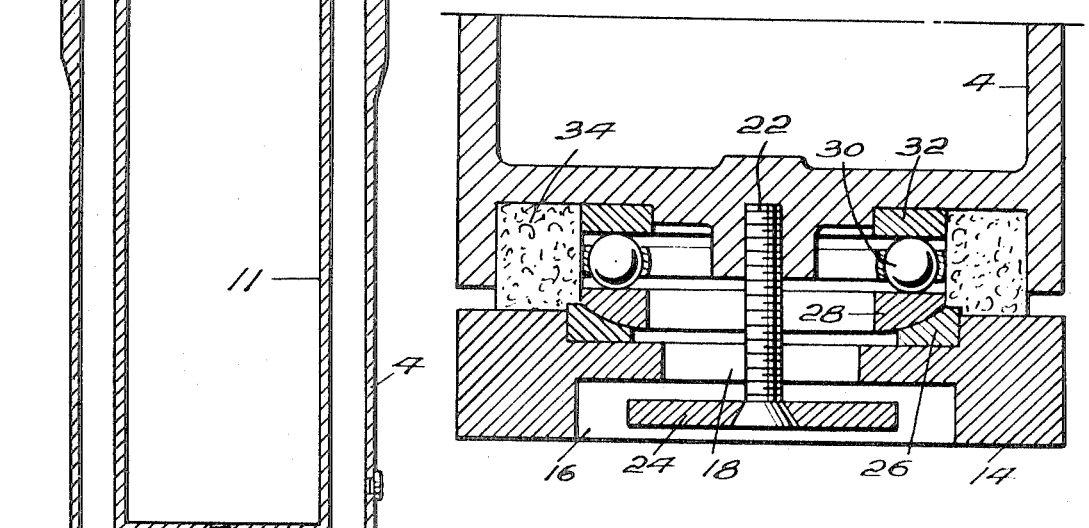
FIG. 3 is an enlargement of the bottom part of FIG. 2.
Figure 2:
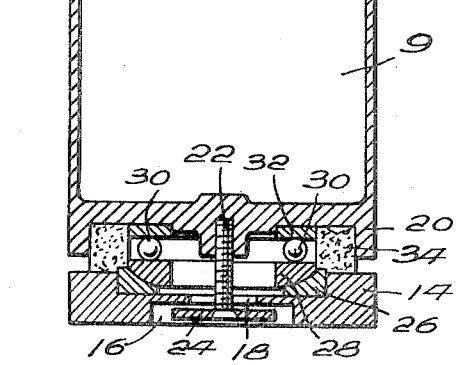
FIG. 2 is a vertical cross section through one of the legs.

Reference to FIG. 1, there is shown a table having a top 2 supported by legs 4 at the bottom of each of which are the foot members 6 to be described in detail below.

Each leg 4 is a hollow cylinder with an air inlet 8 opening into a surge tank 9 which communicates through an opening 10 with a reservoir 11 closed at the top by a rolling diaphragm 12 which supports a piston 13 on which the table top is carried. The diaphragm has a cross section which is substantially larger than the opening in the top of the cylinder and is folded on itself, so that it permits movement of the piston with the least possible friction, and without stretching the diaphragm.

In the preferred form of the invention, each leg is provided with a sensing means which senses the relative height and level of the table and maintains such an air pressure in the cylinder as to correct any deviations from the desired level. This mechanism per se is known and forms no part of the present invention, and is therefore not shown in detail.

In fact, the foot member to be described below is useful within the broader aspects of the invention is connection with legs which are provided with a preset pressure, and therefore constitute merely resilient stems, or with other types of vertically yieldable vibration-absorbing mountings, but is particularly adapted to cooperate with a rolling diaphragm structure of the type described above.

The foot portion includes a base member 14 adapted to rest on the floor having an annular recess 16 in the lower face and a central opening 18. The leg 4 has a downwardly extending flange 20 and a mechanical stop member 22 extending downwardly from its bottom through the opening 18 and carrying a disc 24 of greater dimensions than the opening 18. The member 14 has a recess in its upper face in which is seated an annular member 26 having a substantially spherical upper surface, on which rests a mating spherically shaped annular member 28. This latter forms one race of a ball bearing 30, the other race 32 of which is secured on the bottom of the leg 4.

The relative lateral movement of the let with respect to the foot member is limited by a polyurethane ring 34 which is positioned between the downwardly extended ring 24 and the ball bearing and its races. This ring is of sufficient resistance to prevent under normal circumstances any engagement of the member 24 with the wall of the recess 16.

The races 28 and 32 have parallel plane horizontal surfaces, these surfaces being plane and parallel through the whole possible range of movement of the balls with respect to the surfaces of the races.

With respect to mass loading of the top, two possible conditions exist. Either the center of gravity of the isolated mass is in the plane of support or not. When the center of gravity is in the plane of support, all vibrational modes are decoupled. There is then no isolation provided by the air piston from lateral disturbances, and the degree of vertical mode isolation is determined by the resonant frequency of the system. However, ordinarily the center of gravity is not in the plane of support, and coupling will occur. Coupling of the modes results in horizontal disturbances being attenuated at the expense of introducing vertical motion. This degrades the vertical isolation performance of the air piston.

The thrust bearing allows the floor to move laterally without transferring this motion to the table substructure. This limits the lateral accelerations to which the center of gravity is subject, and reduces the energy which can be coupled to the vertical mode. It also prevents the introduction of forces which create flexural vibrations in the substructure.

As has been explained above, such an arrangement eliminates to a very great extent the effect of lateral vibrations of the floor on which the device rests, coming as close as possible to allowing the floor to move underneath the table without disturbing the table top. At the same time, it results in a reduction in or elimination of vertical vibrations of the table resulting from the pistons action in converting lateral vibrations to the floor into vertical vibrations.

By the cooperative action of the air piston and thrust bearing, performance superior to either element used alone is achieved.

We claim:

1. An isolating leg structure for tables or the like comprising a main leg portion comprising a resilient means for isolating at least vertical vibration components, and below said vibration-isolating means a floor-engaging foot member and having between said floor-engaging foot member and said leg portion a pair of flat plane horizontal parallel races one on the foot member and one on the main leg portion opposed to each other, and rolling antifriction means interposed between and engaging the faces of said races, such means mounting said foot and leg members for relative horizontal movement therebetween transverse to the vertical axis of the leg, the faces of said races being flat through the whole possible range of lateral horizontal movement of the leg portion with respect to the foot portion, whereby said rolling means engage at all times between said flat faces of the races and said races remain constantly spaced from each other in a vertical direction.

2. In a structure as claimed in claim 1, a ring of elastic material surrounding the antifriction means positioned between the leg portion and the antifriction means and limiting lateral movement of the leg portion with respect to the foot portion.

3. In a structure as claimed in claim 1, one of said races having a substantially spherical face opposite the flat face thereof, and the part by which said race is carried having a mating substantially spherical seat.

4. In a structure as claimed in claim 1, said vibration-isolating means comprising means forming a gas-containing cylinder within the leg, a flexible diaphragm closing the top of said cylinder and a table-supporting member carried by the diaphragm, said diaphragm being folded on itself around said member to permit movement of the member without stretching the diaphragm.

* * * * *